United States Patent
Hung

(10) Patent No.: US 10,415,749 B2
(45) Date of Patent: Sep. 17, 2019

(54) COUPLER OF GREASE GUN

(71) Applicant: KING CHO MACHINERY INDUSTRIAL CO., LTD., Taichung (TW)

(72) Inventor: Fu Tien Hung, Taichung (TW)

(73) Assignee: King Cho Machinery Industrial Co., Ltd., Taichung (TW)

( * ) Notice: Subject to any disclaimer, the term of this patent is extended or adjusted under 35 U.S.C. 154(b) by 133 days.

(21) Appl. No.: 15/591,518

(22) Filed: May 10, 2017

(65) Prior Publication Data
US 2018/0299065 A1  Oct. 18, 2018

(30) Foreign Application Priority Data

Apr. 12, 2017 (TW) .............................. 106205065 U

(51) Int. Cl.
| | | |
|---|---|---|
| *F16L 37/12* | (2006.01) | |
| *F16N 21/00* | (2006.01) | |
| *F16N 3/12* | (2006.01) | |
| *F16N 21/04* | (2006.01) | |
| *F16L 37/138* | (2006.01) | |
| *F16K 15/04* | (2006.01) | |
| *F16L 37/44* | (2006.01) | |
| *F16N 5/02* | (2006.01) | |

(52) U.S. Cl.
CPC ............ *F16N 21/00* (2013.01); *F16K 15/044* (2013.01); *F16L 37/12* (2013.01); *F16L 37/121* (2013.01); *F16L 37/138* (2013.01); *F16L 37/44* (2013.01); *F16N 3/12* (2013.01); *F16N 21/04* (2013.01); *F16N 5/02* (2013.01)

(58) Field of Classification Search
CPC ..... F16L 37/12; F16L 37/121; F16L 37/0841; F16L 37/138; F16N 5/02
USPC .................................. 137/515, 798; 285/308
See application file for complete search history.

(56) References Cited

U.S. PATENT DOCUMENTS

| | | | |
|---|---|---|---|
| 8,955,544 B2 * | 2/2015 | Gurney ................. | F16L 37/138 137/539 |
| 2014/0203550 A1 * | 7/2014 | Utsch .................. | F16L 37/1205 285/308 |

* cited by examiner

*Primary Examiner* — Marina A Tietjen
*Assistant Examiner* — Paul J Gray
(74) *Attorney, Agent, or Firm* — Rosenberg, Klein & Lee

(57) ABSTRACT

A coupler connected a hose of a grease gun includes a body having a path defined therethrough. A check valve unit and a sealing unit are located in the body. The check valve includes a spring which biases the sealing unit. A groove is defined in an outer surface of the body. A socket is mounted to the body and multiple pawls are received in the socket. The pawls each have a first end engaged with the groove, and a second end of each pawl is controlled to be connected to a fitting member. The socket has a flange extending from the inner periphery. The second ends of the pawls removably contact the flange. A trigger is pivotably connected to the body and drives the socket which is moved by pivoting the trigger so as to control the pawls to engaged with or release the fitting member.

6 Claims, 9 Drawing Sheets

COUPLER OF GREASE GUN

BACKGROUND OF THE INVENTION

1. Fields of the Invention

The present invention relates to a coupler for a grease gun, and more particularly, to a coupler that is able to be connected with fitting member of different sizes.

2. Descriptions of Related Art

The moving parts are lubricated by adding grease thereto, and there is a hose connected to the moving parts so as to introduce grease to the moving parts. The hose has a fitting member on the distal end thereof to which the grease gun is connected so as to introduce grease to the moving parts via the hose. Usually, the user holds the hose which is connected to the fitting member, and the other hand of the user operates the grease gun. This is difficult to control the connection between the hose and the fitting member, and leakage happens often.

FIG. 8 discloses a coupler 8 which includes multiple pawls 81 which have proper flexibility, and when the coupler 8 is connected to a fitting member "c", the pawls 81 hold the fitting member "c" to secure the connection. Nevertheless, when the pawls 81 are reversed and/or damaged, and if the user inserts the fitting member "c" into the coupler 8 by force, the coupler 8 may be stocked and cannot be separated from the fitting member "c".

As shown in FIG. 9, U.S. Pat. No. 8,955,544 discloses a trigger 91 which is operated to pull the socket 82 to expose the pawls 93, and the pawls 93 are opened to easily accommodate the Zerk-type fitting member "c" therein.

However, the length "L" of the fitting member "c" may vary, and the room 94 of the coupler 9 is fixed, so that some of the fitting members "c" cannot be connected to the coupler 9 by the pawls 93. Leakage may happen when the pawls 93 are not functioned as expected.

The present invention intends to provide a coupler for a grease gun, and the coupler is designed to be connected with the fitting members of different sizes.

SUMMARY OF THE INVENTION

The present invention relates to a coupler connected a hose of a grease gun, and comprises a body having a path defined therethrough. A groove is defined in an outer surface of the body. A check valve unit and a sealing unit are located in the body. The check valve includes a spring which biases the sealing unit. A socket is mounted to the body and multiple pawls are received in the socket. The pawls each have a first end engaged with the groove, and a second end of each pawl is controlled to be connected to a fitting member. The socket has a flange extending from the inner periphery. The second ends of the pawls removably contact the flange. A trigger is pivotably connected to the body and drives the socket which is moved by pivoting the trigger so as to control the pawls to engaged with or release the fitting member.

Preferably, the check valve unit includes a ball which is biased by the spring to seal a cone-shaped outlet of the path.

Preferably, the second part includes a tapered portion defined in the outer surface thereof, and the tapered portion is located corresponding to the pawls so as to guide and activate the pawls.

Preferably, the body includes two flat faces. The trigger includes two flexible urging members which are located corresponding to the fat faces. The urging members position the trigger to the body when the pawls are engaged with the fitting member.

Preferably, the pawls each have a hooking end so as to be engaged with the fitting member.

Preferably, there are two links connected between the trigger and the socket. Each link has a first end thereof connected to one side of the trigger, and each link has a second end thereof pivotably connected to one side of the socket. When the trigger is pivoted away from the body, the socket moves toward the fitting member and the pawls are opened and disengaged from the fitting member. When the trigger is pivoted toward the body, the socket moves away from the fitting member and the pawls are closed and engaged with the fitting member.

Preferably, the sealing unit includes a metal housing and a rubber part which is received in the metal housing. The rubber part includes a passage which axially communicates with the path.

The advantages of the present invention are that the pawls are opened and closed by pivoting the trigger to move the socket so as to easily connect the fitting member or to dis-connect the fitting member.

By the biasing force of the spring of the check valve unit, the distance between the pawls and the sealing unit can be changed so that the coupler can be connected with the fitting members of different sizes. The biasing force also prevents leakage.

There are two urging members located at the two flat faces of the body so that when the trigger operates the pawls, the two urging members position the trigger at the two flat faces of the body, and ensures that the trigger does not loose to maintain the engaging force of the pawls.

The socket is driven by the trigger by the links. The spring of the sealing unit makes the contact surfaces between the sealing unit and the fitting member be tight, so that one part is saved when comparted with the conventional couplers.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
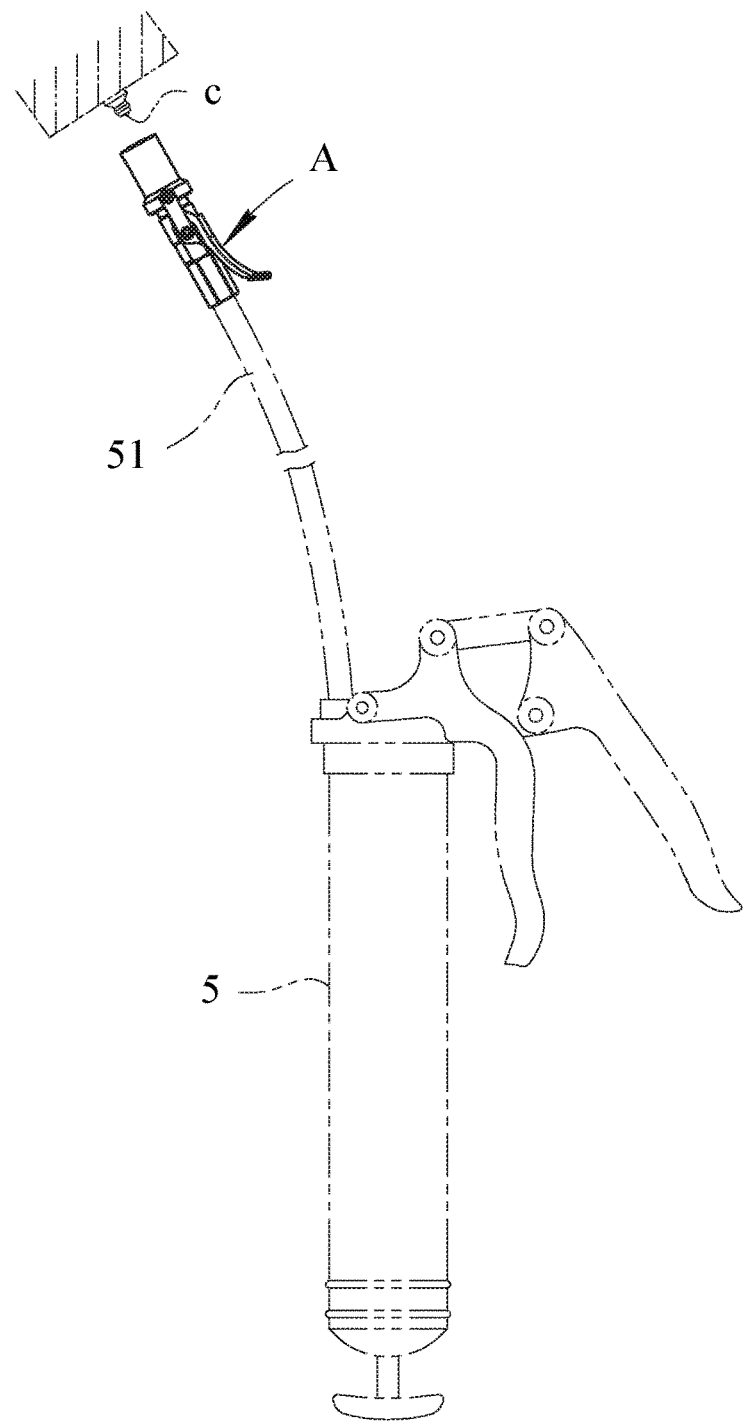
FIG. 1 shows the grease gun with the coupler of the present invention.
Figure 2:
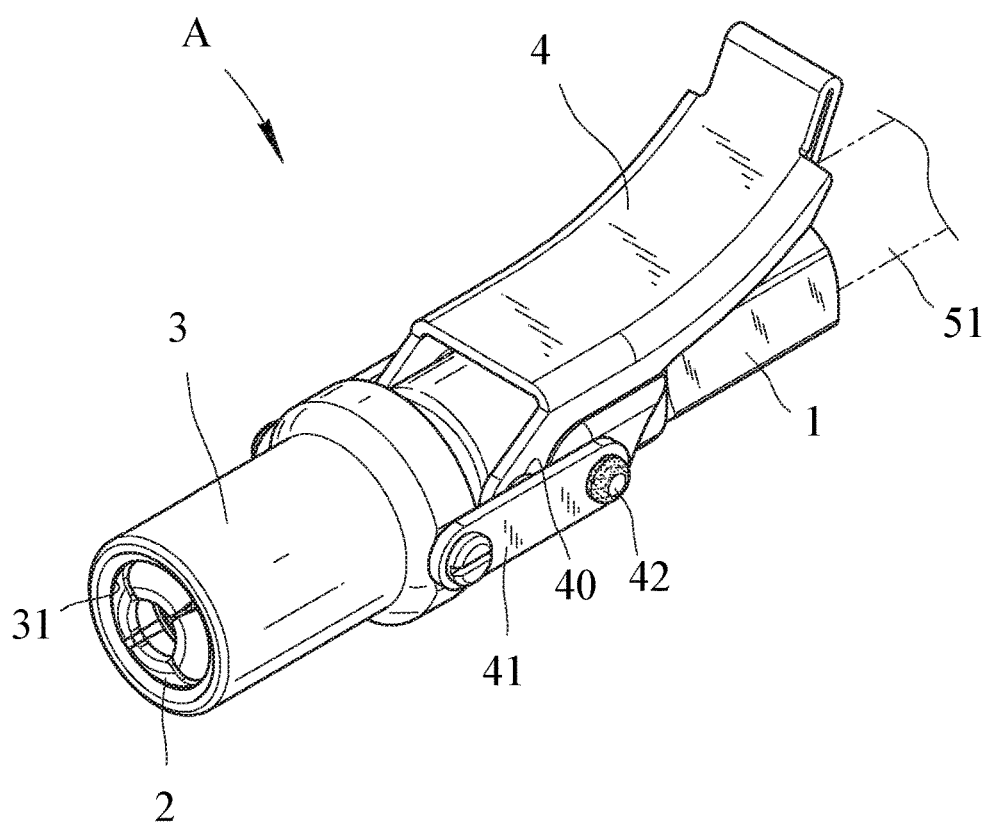
FIG. 2 is a perspective view to show the coupler of the present invention.
Figure 3:
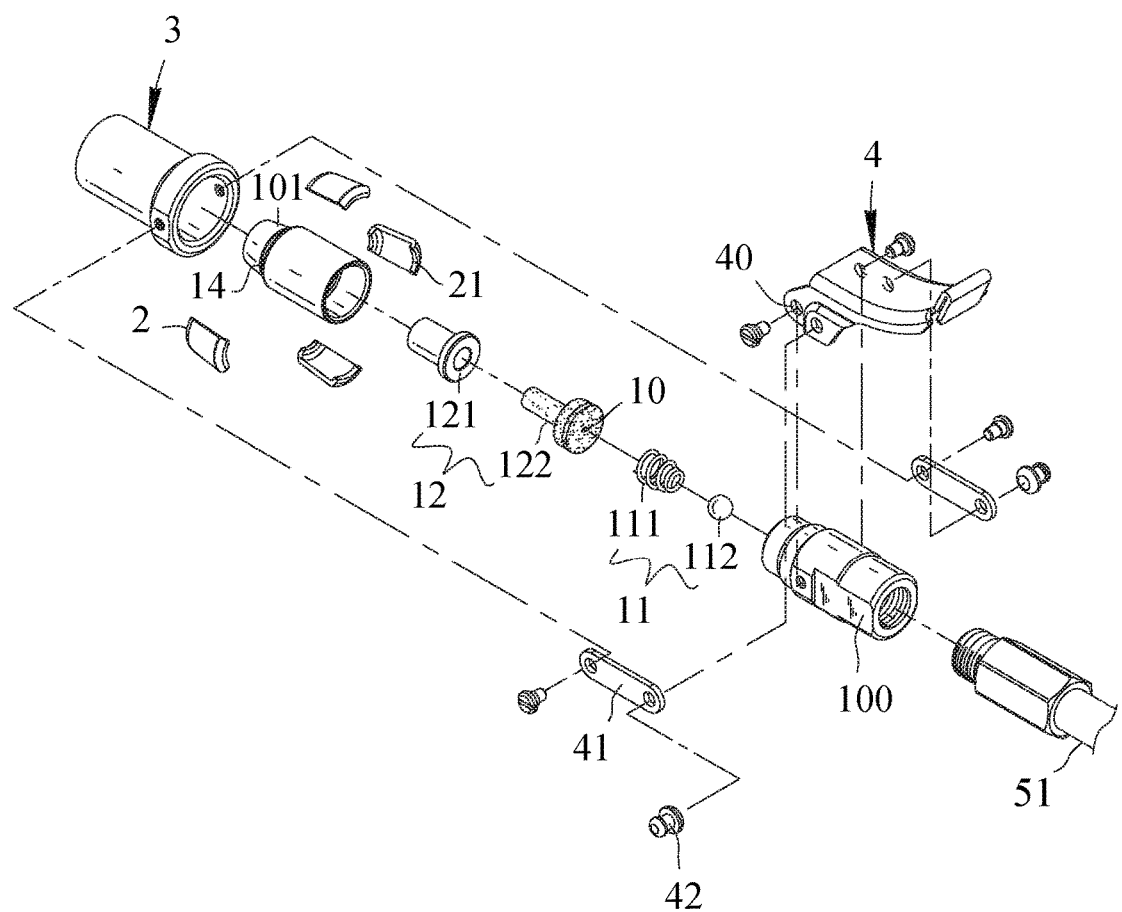
FIG. 3 is an exploded view of the coupler of the present invention.

Referring to FIGS. 1 to 4, the coupler "A" of the present invention is connected a hose 51 of a grease gun 5, and comprises a body 1 having a first part 100 and a second part 101, wherein the first part 100 has a path 10 defined therethrough, and the second part 101 has an axial passage and mounted to the front end of the first part 100. A check valve unit 11 and a sealing unit 12 are located in the body 1. The check valve unit 11 includes a spring 111 and a ball 112, wherein the spring 111 is biased between the sealing unit 12 and the ball 112. The ball 112 is biased by the spring 111 to seal a cone-shaped outlet 101 of the path 10. A groove 14 is defined in the outer surface of the second part 101, and the second part 101 includes a tapered portion 13 defined in the outer surface thereof. The sealing unit 12 includes a metal housing 121 and a rubber part 122 which is received in the metal housing 121. The rubber part 122 includes a passage which axially communicates with the path 10. When the coupler "A" is connected to the fitting member "c", the spring 111 biases the rubber part 122 to seal the inlet of the fitting member "c".

A socket 3 is mounted to the second part 101 and has a flange 31 extending from the inner periphery. Multiple pawls 2 are received in the socket 3, and each pawl 2 has a first end formed as a hooking end 21 which is engaged with the groove 14, and a second end of each pawl 2 removably contacts the flange 31 so as to be connected to a fitting member. The tapered portion 13 is located corresponding to the pawls 2.

A trigger 4 is pivotably connected to the body 1 at the pivotal position 40, at least one link 41 is connected between the trigger 4 and the socket 3. In this embodiment, there are two links 41 used. It is noted that the first part 100 includes two flat faces 15, and the trigger 4 includes two flexible urging members 42 which are made by elastic rubber and located corresponding to the fat faces 15. The urging members 42 extend through the holes of the links and the trigger as shown in FIG. 5 and position the trigger 4 to the body 1 when the pawls 2 are engaged with the fitting member.

Figure 6:
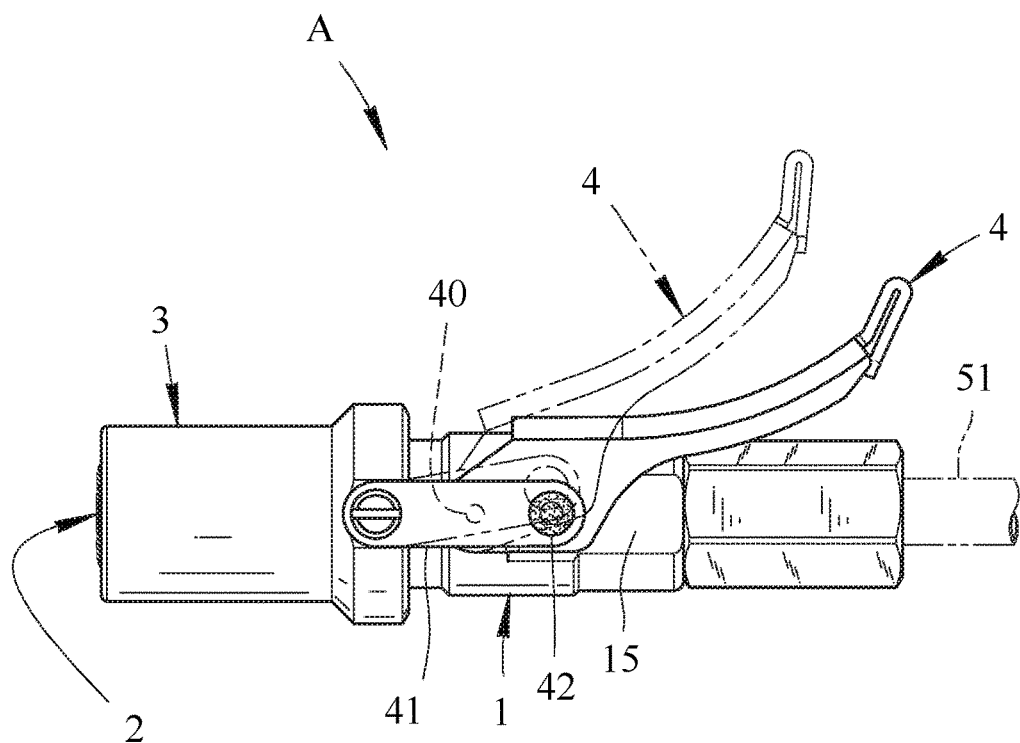
FIG. 6 shows that the trigger of the coupler of the present invention is operated.
Figure 7:
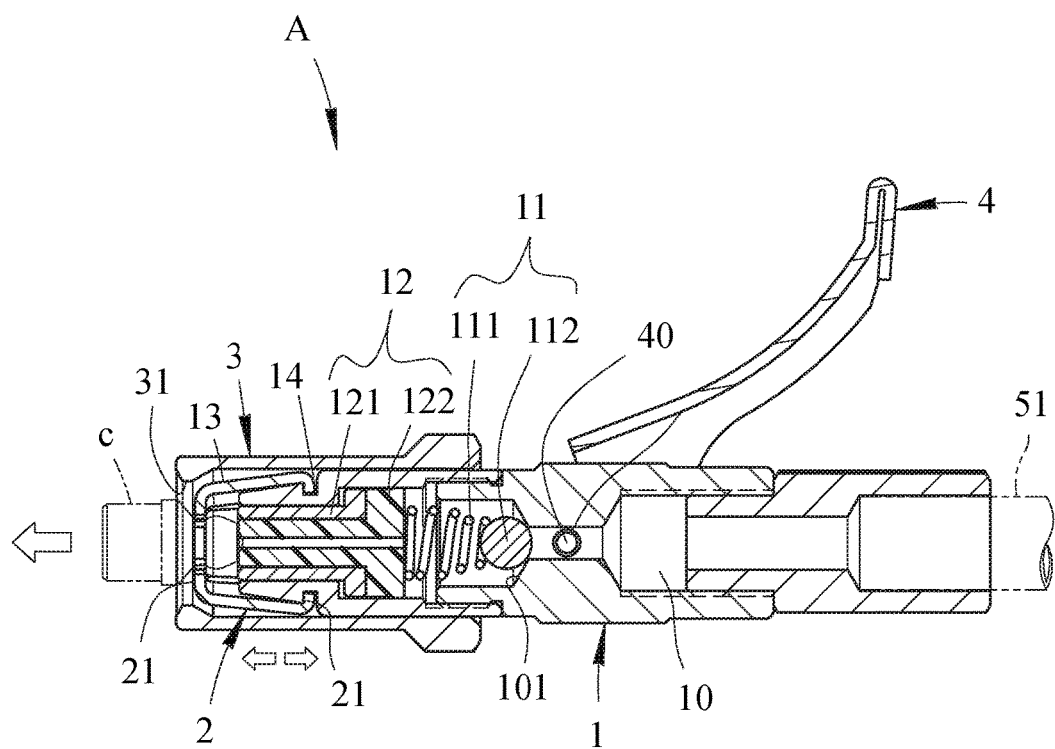
FIG. 7 shows that the pawls are released and the fitting member is to be connected to the coupler of the present invention.
Figure 8:
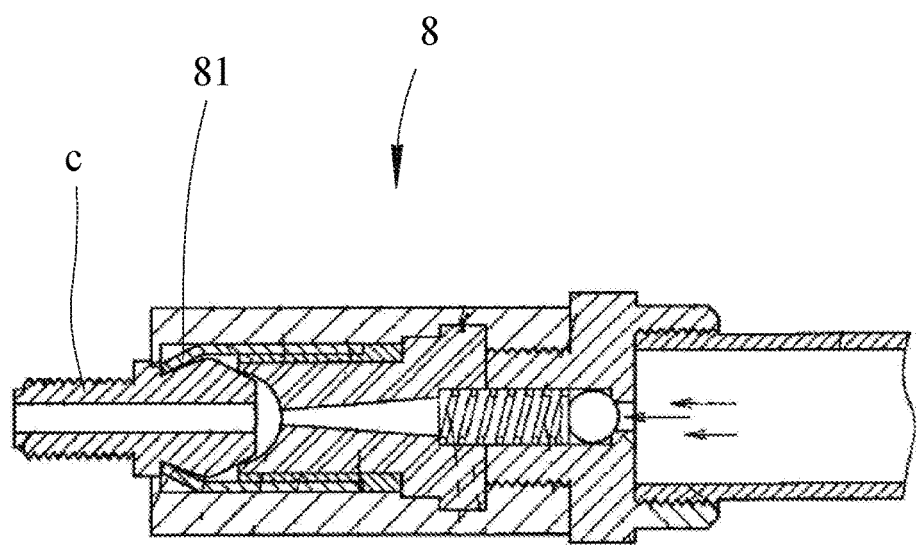
FIG. 8 is a cross sectional view to show a conventional coupler.
Figure 9:
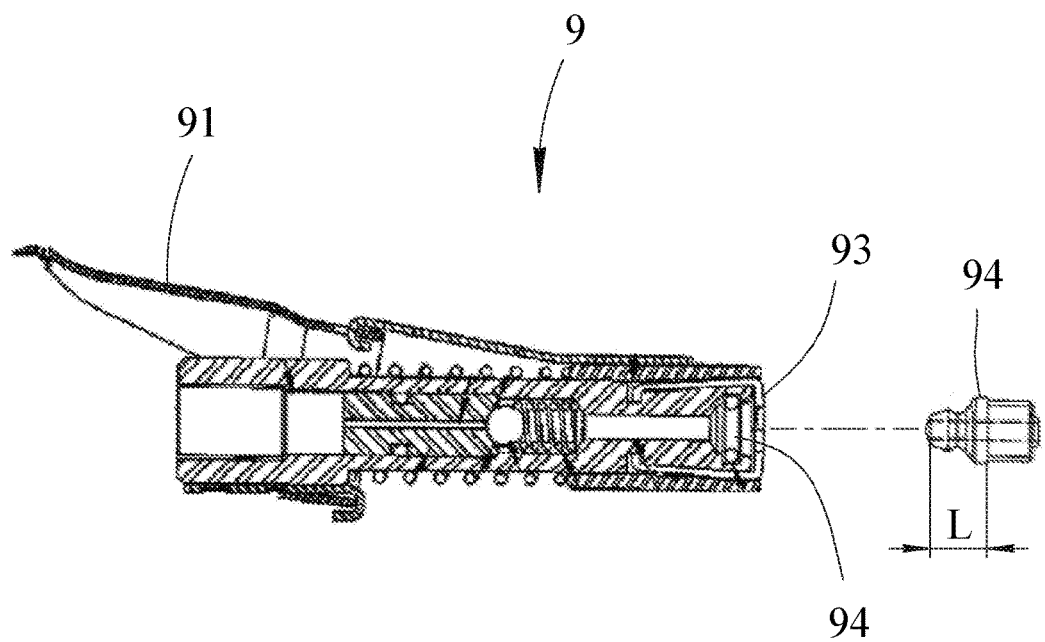
FIG. 9 shows another conventional coupler.

As shown in FIGS. 1, 6 and 7, when connecting the coupler "A" to the fitting member "c", the user pivots the trigger 4 forward, the trigger 4 pivots about the pivotal position 40 counter clockwise, and drives the socket forward by the connection of the links 41. The gap between the pawls 2 and the inside of the socket 3 becomes large enough to allow the fitting member to be fit into the coupler "A". The fitting member drives the hooking ends 21 of the pawls 2 to move outward until the end face of the fitting member contacts the sealing unit 12.

Figure 4:
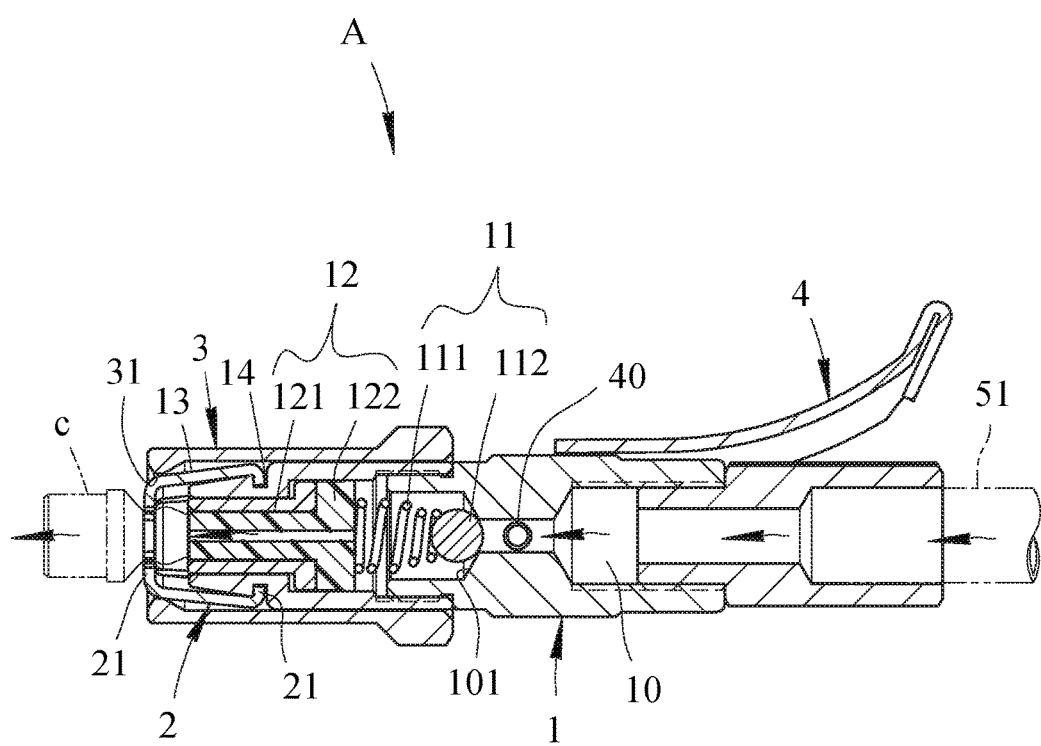
FIG. 4 shows that the fitting member is engaged with the pawls of the coupler of the present invention.
Figure 5:
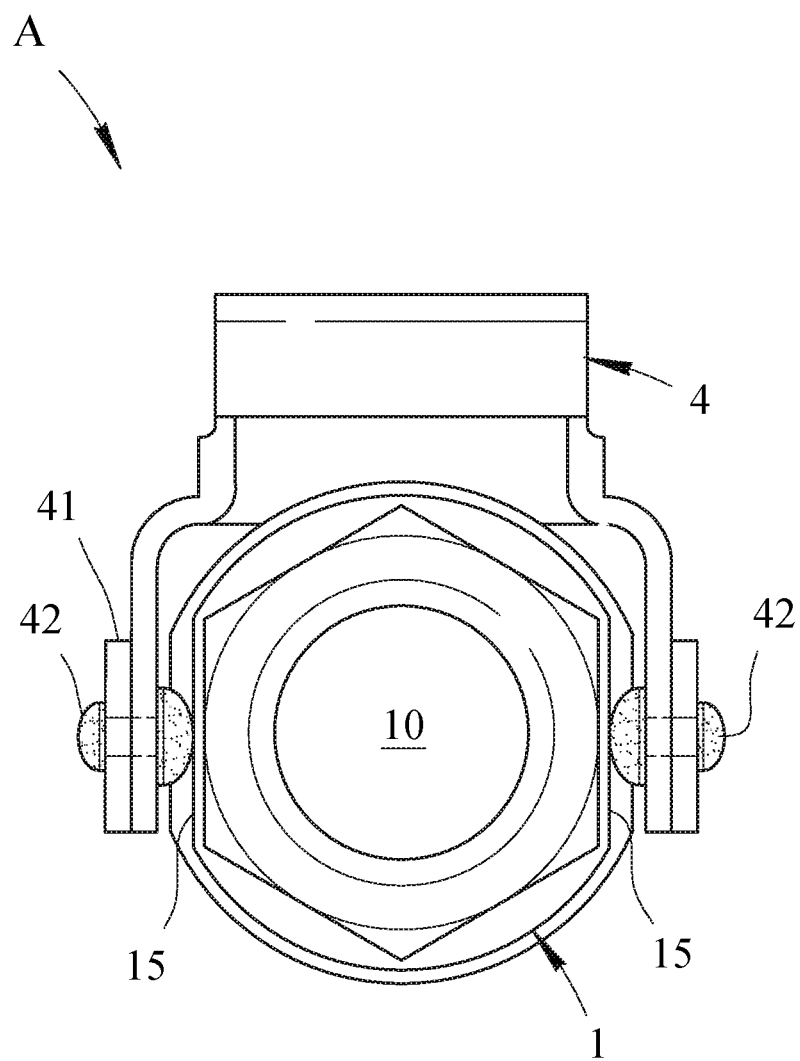
FIG. 5 shows an end view of the coupler of the present invention.

As shown in FIGS. 1, 4 and 5, the user then pivots the trigger backward, the trigger 4 pivots about the pivotal position 40 clockwise, and drives the socket 3 backward by the connection of the links 41, and the flange 31 contacts the second ends of the Thanks the tapered portion 13 of the second part 101, the pawls 2 gradually move inward. When the trigger 4 is pivoted to its extreme position, the urging members 42 clamp the two flat faces 15 to position the trigger 4. The pawls 2 are engaged with the fitting member "c". Therefore, the user can operate the grease gun by both of his/her hands, the grease passes through the hose 51, the path 10 of the coupler "A", the fitting member "c" and is introduced into the machine to be lubricated.

As shown in FIG. 7, after the greasing operation is finished, the user pivots the trigger 4 forward again to move the hooking ends 21 outward so that the coupler "A" is able to be separated from the fitting member "c", and the sealing unit 12 moves back to its initial position.

While we have shown and described the embodiment in accordance with the present invention, it should be clear to those skilled in the art that further embodiments may be made without departing from the scope of the present invention.

What is claimed is:

1. A coupler for connection of a hose of a grease gun, comprising:
   a body having a first part and a second part, the first part having a path defined therethrough, the second part having an axial passage and mounted to a front end of the first part, a check valve unit and a sealing unit located in the body, the check valve unit having a spring which biases the sealing unit, a groove defined in an outer surface of the second part;
   a socket mounted to the second part and having a flange extending from an inner periphery, multiple pawls received in the socket, each pawl having a first end engaged with the groove, a second end of each pawl removably contacting the flange so as to be connected to a fitting member;
   a trigger pivotably connected to the body, two links connected between the trigger and the socket, each link having a first end thereof connected to one side of the trigger, each link having a second end thereof pivotably connected to one side of the socket, when the trigger is pivoted away from the body, the socket is adapted to move toward the fitting member, the pawls are opened and disengaged from the fitting member, when the trigger is pivoted toward the body, the socket is adapted to move away from the fitting member, the pawls are closed and engaged with the fitting member, when the coupler is adapted to be connected to the fitting member, the spring pushes the sealing unit which contacts against the fitting member, wherein the pawls remain within the socket in both the open and closed positions of the socket.

2. The coupler as claimed in claim 1, wherein the check valve unit includes a ball which is biased by the spring to seal a cone-shaped outlet of the path.

3. The coupler as claimed in claim 1, wherein the second part includes a tapered portion defined in an outer surface thereof, the tapered portion is located corresponding to the pawls.

4. The coupler as claimed in claim 1, wherein the first part includes two flat faces, the trigger includes two flexible urging members which are located corresponding to the flat faces, the urging members position the trigger to the body when the pawls are adapted to be engaged with the fitting member.

5. The coupler as claimed in claim 1, wherein the pawls each have a hooking end.

6. The coupler as claimed in claim 1, wherein the sealing unit includes a metal housing and a rubber part which is received in the metal housing, the rubber part includes a passage which axially communicates with the path.

* * * * *